(12) United States Patent
Xie et al.

(10) Patent No.: US 11,147,005 B2
(45) Date of Patent: *Oct. 12, 2021

(54) FAST CELL RESELECTION

(71) Applicant: QUALCOMM Incorporated, San Diego, CA (US)

(72) Inventors: Ling Xie, Beijing (CN); Shiau-He Tsai, San Diego, CA (US); Jie Mao, Beijing (CN); Yan Zhang, Beijing (CN); Huichun Chen, Beijing (CN); Shanshan Wang, San Diego, CA (US); Song Tian, San Diego, CA (US); Yong Xie, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,983

(22) Filed: Feb. 4, 2020

(65) Prior Publication Data

US 2020/0178143 A1 Jun. 4, 2020

Related U.S. Application Data

(63) Continuation of application No. 15/762,439, filed as application No. PCT/CN2015/099491 on Dec. 29, 2015, now Pat. No. 10,588,068.

(51) Int. Cl.
*H04W 36/00* (2009.01)
*H04W 36/30* (2009.01)
(Continued)

(52) U.S. Cl.
CPC .......... *H04W 36/30* (2013.01); *H04W 48/20* (2013.01); *H04W 48/16* (2013.01)

(58) Field of Classification Search
None
See application file for complete search history.

(56) References Cited

U.S. PATENT DOCUMENTS

2009/0247161 A1* 10/2009 Pani .................. H04W 36/0085
455/435.3
2010/0208707 A1 8/2010 Hamabe et al.
(Continued)

FOREIGN PATENT DOCUMENTS

| CN | 101557627 A | 10/2009 |
| CN | 102474762 A | 5/2012 |

(Continued)

OTHER PUBLICATIONS

International Search Report and Written Opinion—PCT/CN2015/099491—ISA/EPO—dated Sep. 21, 2016.
(Continued)

*Primary Examiner* — Suhail Khan
(74) *Attorney, Agent, or Firm* — Qualcomm Incorporated

(57) ABSTRACT

A user equipment (UE) expedites cell reselection by reselecting a neighbor cell prior to call setup. In one instance, the UE measures a signal quality of a serving cell and a signal quality of the neighbor cell. The UE starts a reselection timer for reselecting the neighbor cell based on the measured signal quality of the serving cell and the measured signal quality of the neighbor cell. The UE reselects the neighbor cell prior to a scheduled expiration of the reselection timer.

16 Claims, 12 Drawing Sheets

(51) Int. Cl.
  *H04W 48/20* (2009.01)
  *H04W 48/16* (2009.01)

(56) References Cited

U.S. PATENT DOCUMENTS

| | | |
|---|---|---|
| 2010/0311421 A1 | 12/2010 | Mach |
| 2011/0021201 A1 | 1/2011 | Lee et al. |
| 2014/0071939 A1 | 3/2014 | Yang et al. |
| 2014/0315555 A1 | 10/2014 | Zhang et al. |
| 2015/0282010 A1 | 10/2015 | Yang et al. |
| 2015/0358864 A1 | 12/2015 | Park et al. |
| 2016/0007241 A1* | 1/2016 | Karri .................. H04W 36/14 455/436 |
| 2016/0135092 A1* | 5/2016 | Park .................. H04W 36/0005 455/436 |
| 2018/0288667 A1 | 10/2018 | Xie et al. |

FOREIGN PATENT DOCUMENTS

| | | |
|---|---|---|
| CN | 102474777 A | 5/2012 |
| EP | 1971176 A2 | 9/2008 |
| JP | 2010521119 A | 6/2010 |
| JP | 2013529409 A | 7/2013 |
| JP | 2015526963 A | 9/2015 |
| JP | 2015527025 A | 9/2015 |
| KR | 20100041141 A | 4/2010 |
| KR | 101481030 B1 | 1/2015 |
| WO | 2010017221 A1 | 2/2010 |

OTHER PUBLICATIONS

Nokia, et al., "Text proposal for Mobility Requirements for E-UTRA to UTRA", 3GPP TSG-RAN WG4 Meeting #45, 3GPP Draft; R4-072176, 3rd Generation Partnership Project (3GPP), Mobile Competence Centre; 650, Route Des Lucioles; F-06921 Sophia-Antipolis Cedex; France, vol. RAN WG4, No. Jeju; Nov. 14, 2007, Nov. 14, 2007 (Nov. 14, 2007), 8 Pages XP050178571, [retrieved on Nov. 14, 2007] p. 3, Case 1, p. 3, Case 2.
Supplementary European Search Report—EP15911738—Search Authority—Munich—dated Jun. 25, 2019.

* cited by examiner

FAST CELL RESELECTION

CROSS-REFERENCE TO RELATED APPLICATIONS

The present application is a continuation of U.S. patent application Ser. No. 15/762,439, filed on Mar. 22, 2018, and entitled "FAST CELL RESELECTION," which is a National Stage Entry of PCT/CN2015/099491, filed on Dec. 29, 2015, and entitled "FAST CELL RESELECTION," the disclosures of which are expressly incorporated by reference herein in their entireties.

BACKGROUND

Field

Aspects of the present disclosure relate generally to wireless communication systems, and more particularly, to expedited cell reselection.

Background

Wireless communication networks are widely deployed to provide various communication services, such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as high speed packet access (HSPA), which provides higher data transfer speeds and capacity to associated UMTS networks. HSPA is a collection of two mobile telephony protocols, high speed downlink packet access (HSDPA) and high speed uplink packet access (HSDPA) that extends and improves the performance of existing wideband protocols.

As the demand for mobile broadband access continues to increase, there exists a need for further improvements in wireless technology. Preferably, these improvements should be applicable to LTE and other multi-access technologies and the telecommunication standards that employ these technologies.

SUMMARY

According to one aspect of the present disclosure, a method of wireless communication includes starting a reselection timer for reselecting to a neighbor cell when a signal quality of a serving cell is determined to fall below a first threshold. The method also includes speeding up reselecting to the neighbor cell based on a difference between the signal quality of the serving cell and the signal quality of the neighbor cell when the signal quality of the serving cell falls below a second threshold.

According to another aspect of the present disclosure, an apparatus for wireless communication includes means for starting a reselection timer for reselecting to a neighbor cell when a signal quality of a serving cell is determined to fall below a first threshold. The apparatus may also include means for speeding up reselecting to the neighbor cell based on a difference between the signal quality of the serving cell and the signal quality of the neighbor cell when the signal quality of the serving cell falls below a second threshold.

Another aspect discloses an apparatus for wireless communication and includes a memory and at least one processor (e.g., one or more processors) coupled to the memory. The processor(s) is configured to start a reselection timer for reselecting to a neighbor cell when a signal quality of a serving cell is determined to fall below a first threshold. The processor(s) is also configured to speed up reselecting to the neighbor cell based on a difference between the signal quality of the serving cell and the signal quality of the neighbor cell when the signal quality of the serving cell falls below a second threshold.

Yet another aspect discloses a non-transitory computer-readable storage medium having non-transitory program code recorded thereon which, when executed by the processor(s), causes the processor(s) to start a reselection timer for reselecting to a neighbor cell when a signal quality of a serving cell is determined to fall below a first threshold. The program code also causes the processor(s) to speed up reselecting to the neighbor cell based on a difference between the signal quality of the serving cell and the signal quality of the neighbor cell when the signal quality of the serving cell falls below a second threshold.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
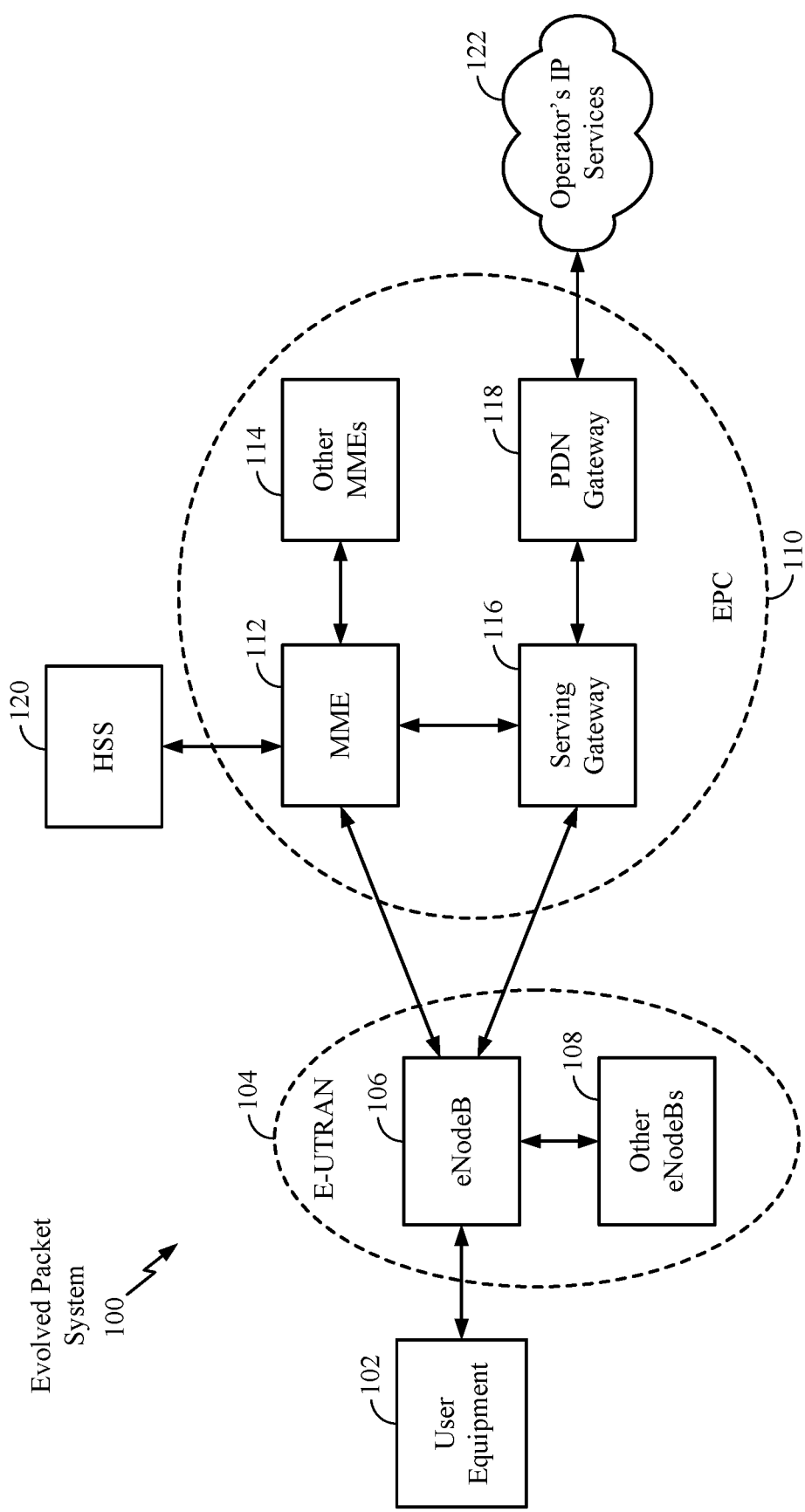
FIG. 1 is a diagram illustrating an example of a network architecture.

FIG. 1 is a diagram illustrating a network architecture 100 of a long term evolution (LTE) network. The LTE network architecture 100 may be referred to as an evolved packet system (EPS) 100. The EPS 100 may include one or more user equipment (UE) 102, an evolved UMTS terrestrial radio access network (E-UTRAN) 104, an evolved packet core (EPC) 110, a home subscriber server (HSS) 120, and an operator's IP services 122. The EPS can interconnect with other access networks, but for simplicity those entities/interfaces are not shown. As shown, the EPS 100 provides packet-switched services, however, as those skilled in the art will readily appreciate, the various concepts presented throughout this disclosure may be extended to networks providing circuit-switched services.

The E-UTRAN 104 includes an evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a notebook, a netbook, a smartbook, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station or apparatus, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a mobility management entity (MME) 112, other MMES 114, a serving gateway 116, and a packet data network (PDN) gateway 118. The MME 112 is the control node that processes the signaling between the UE 102 and the EPC 110. Generally, the MME 112 provides bearer and connection management. All user IP packets are transferred through the serving gateway 116, which itself is connected to the PDN gateway 118. The PDN gateway 118 provides UE IP address allocation as well as other functions. The PDN gateway 118 is connected to the operator's IP services 122. The operator's IP services 122 may include the Internet, the Intranet, an IP multimedia subsystem (IMS), and a PS streaming service (PSS).

Figure 2:
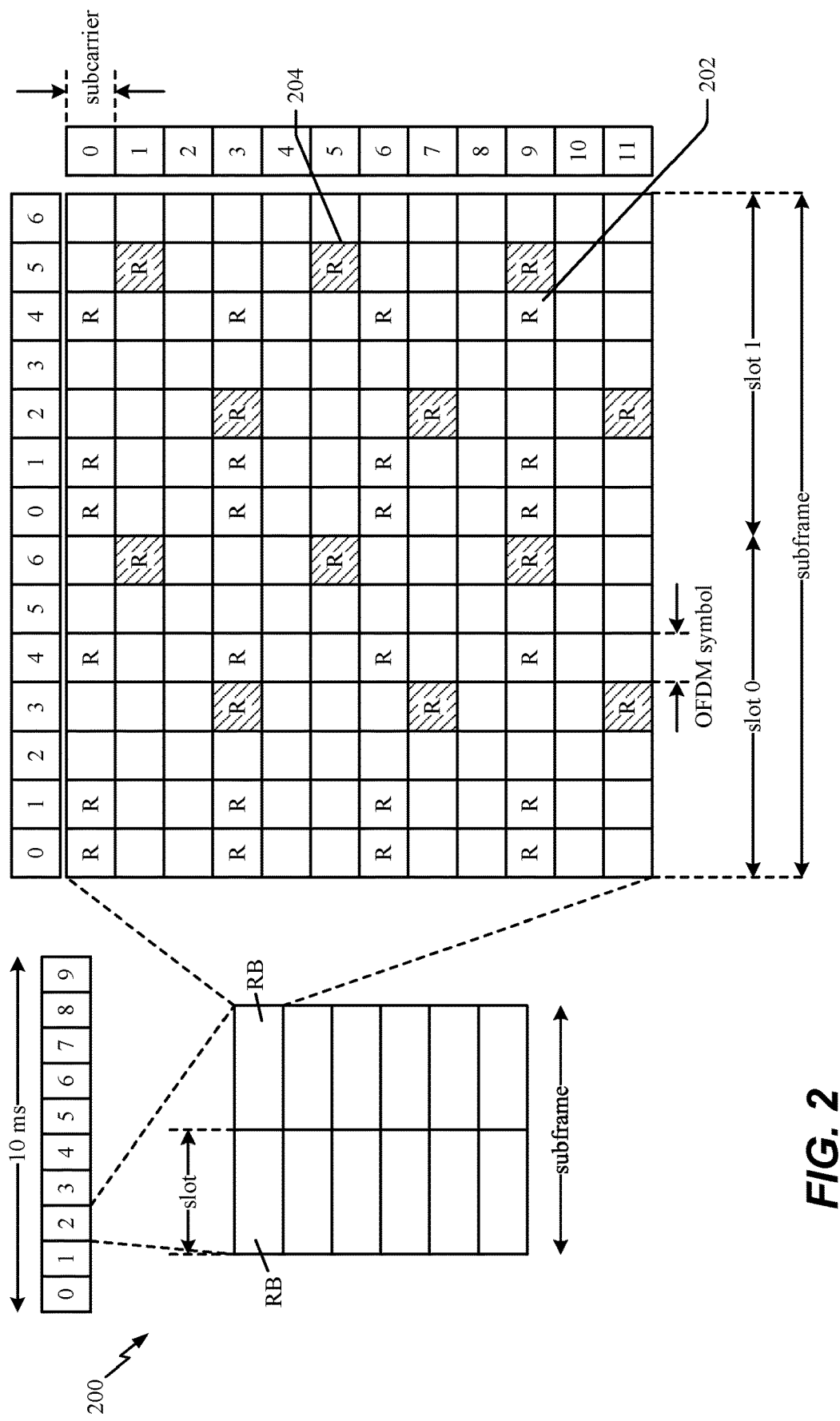
FIG. 2 is a diagram illustrating an example of a downlink frame structure in long term evolution (LTE).

FIG. 2 is a diagram 200 illustrating an example of a downlink frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 202, 204, include downlink reference signals (DL-RS). The DL-RS include cell-specific RS (CRS) (also sometimes called common RS) 202 and UE-specific RS (UE-RS) 204. UE-RS 204 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 3:
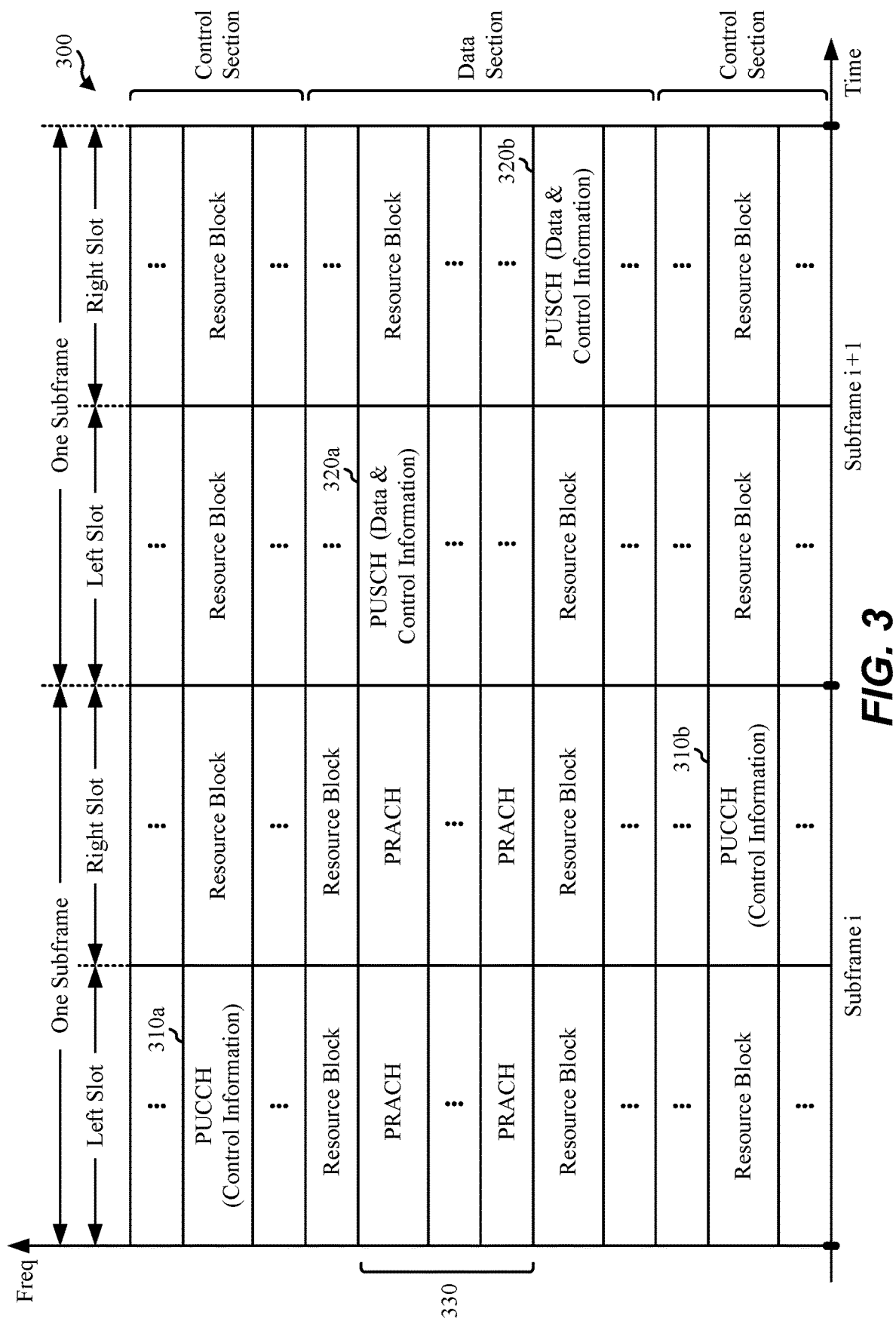
FIG. 3 is a diagram illustrating an example of an uplink frame structure in long term evolution (LTE).

FIG. 3 is a diagram 300 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 310*a*, 310*b* in the control section to transmit control information to an eNodeB. The UE may also be assigned resource blocks 320*a*, 320*b* in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 330. The PRACH 330 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
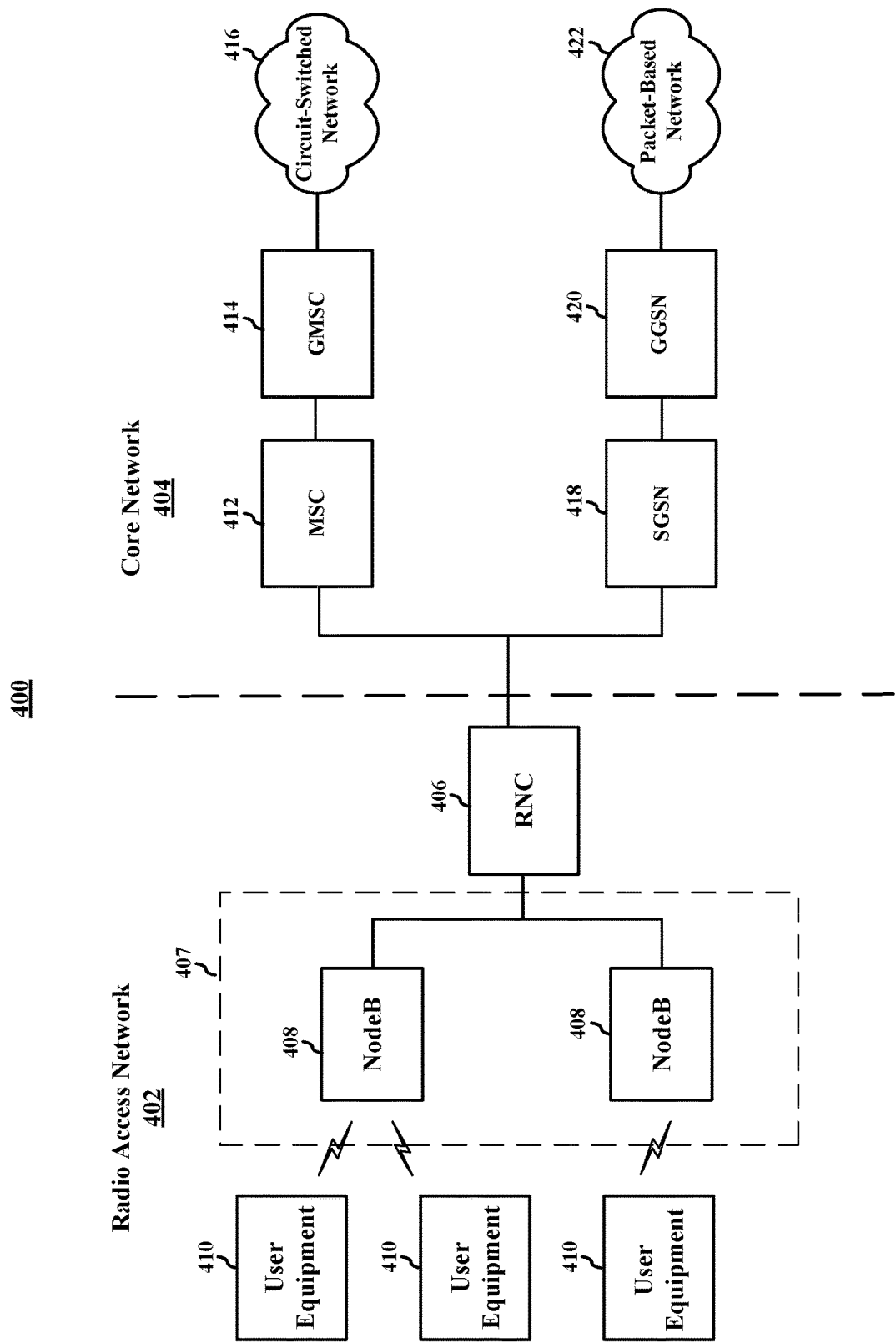
FIG. 4 is a block diagram conceptually illustrating an example of a telecommunications system employing a time division synchronous code division multiple access (TD-SCDMA) standard.

Turning now to FIG. 4, a block diagram is shown illustrating an example of a telecommunications system 400. The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system employing a TD-SCDMA standard. In this example, the UMTS system includes a radio access network (RAN) 402 (e.g., UTRAN) that provides various wireless services including telephony, video, data, messaging, broadcasts, and/or other services. The RAN 402 may be divided into a number of radio network subsystems (RNSs) such as an RNS 407, each controlled by a radio network controller (RNC), such as an RNC 406. For clarity, only the RNC 406 and the RNS 407 are shown; however, the RAN 402 may include any number of RNCs and RNSs in addition to the RNC 406 and RNS 407. The RNC 406 is an apparatus responsible for, among other things, assigning, reconfiguring and releasing radio resources within the RNS 407. The RNC 406 may be interconnected to other RNCs (not shown) in the RAN 402 through various types of interfaces such as a direct physical connection, a virtual network, or the like, using any suitable transport network.

The geographic region covered by the RNS 407 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 408 are shown; however, the RNS 407 may include any number of wireless node Bs. The node Bs 408 provide wireless access points to a core network 404 for any number of mobile apparatuses. For illustrative purposes, three UEs 410 are shown in communication with the node Bs 408. The downlink (DL), also called the forward link, refers to the communication link from a node B to a UE, and the uplink (UL), also called the reverse link, refers to the communication link from a UE to a node B.

The core network 404, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 404 supports circuit-switched services with a mobile switching center (MSC) 412 and a gateway MSC (GMSC) 414. One or more RNCs, such as the RNC 406, may be connected to the MSC 412. The MSC 412 is an apparatus that controls call setup, call routing, and UE mobility functions. The MSC 412 also includes a visitor location register (VLR) (not shown) that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR to determine the UE's location and forwards the call to the particular MSC serving that location.

The core network 404 also supports packet-data services with a serving GPRS support node (SGSN) 418 and a gateway GPRS support node (GGSN) 420. General packet radio service (GPRS) is designed to provide packet-data services at speeds higher than those available with standard GSM circuit-switched data services. The GGSN 420 provides a connection for the RAN 402 to a packet-based network 422. The packet-based network 422 may be the Internet, a private data network, or some other suitable packet-based network. The primary function of the GGSN 420 is to provide the UEs 410 with packet-based network connectivity. Data packets are transferred between the GGSN 420 and the UEs 410 through the SGSN 418, which performs primarily the same functions in the packet-based domain as the MSC 412 performs in the circuit-switched domain.

The UMTS air interface is a spread spectrum direct-sequence code division multiple access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 408 and a UE 410, but divides uplink and downlink transmissions into different time slots in the carrier.

Figure 5:
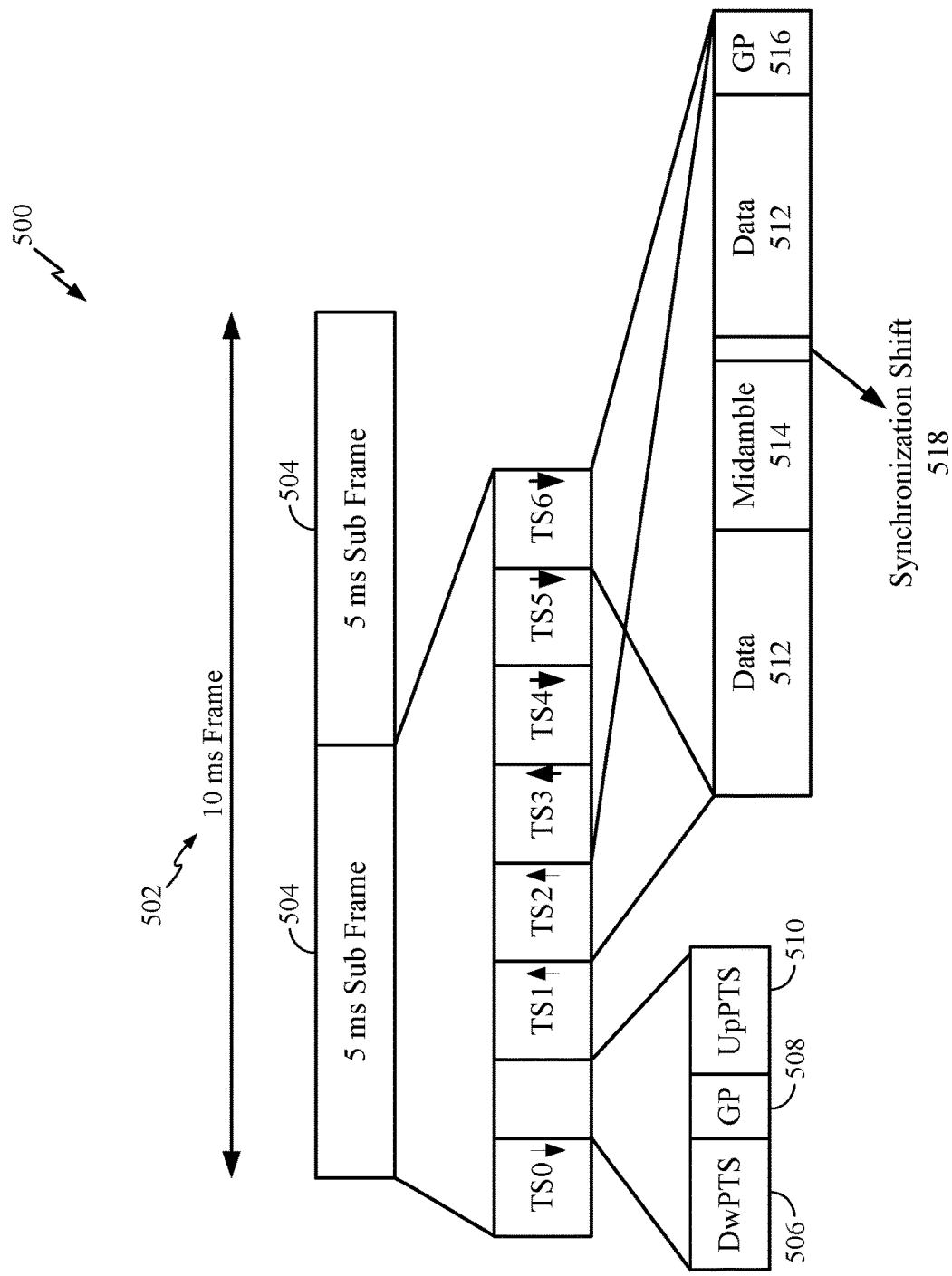
FIG. 5 is a block diagram conceptually illustrating an example of a frame structure for a time division synchronous code division multiple access carrier.

FIG. 5 shows a frame structure 500 for a TD-SCDMA carrier. The TD-SCDMA carrier, as illustrated, has a frame 502 that is 10 ms in length. The chip rate in TD-SCDMA is 1.28 Mcps. The frame 502 has two 5 ms subframes 504, and each of the subframes 504 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 506, a guard period (GP) 508, and an uplink pilot time slot (UpPTS) 510 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 512 (each with a length of 352 chips) separated by a midamble 514 (with a length of 144 chips) and followed by a guard period (GP) 516 (with a length of 16 chips). The midamble 514 may be used for features, such as channel estimation, while the guard period 516 may be used to avoid inter-burst interference. Also transmitted in the data portion is some Layer 1 control information, including synchronization shift (SS) bits 518. Synchronization shift bits 518 only appear in the second part of the data portion. The synchronization shift bits 518 immediately following the midamble can indicate three cases: decrease shift, increase shift, or do nothing in the upload transmit timing. The positions of the synchronization shift bits 518 are not generally used during uplink communications.

Figure 6:
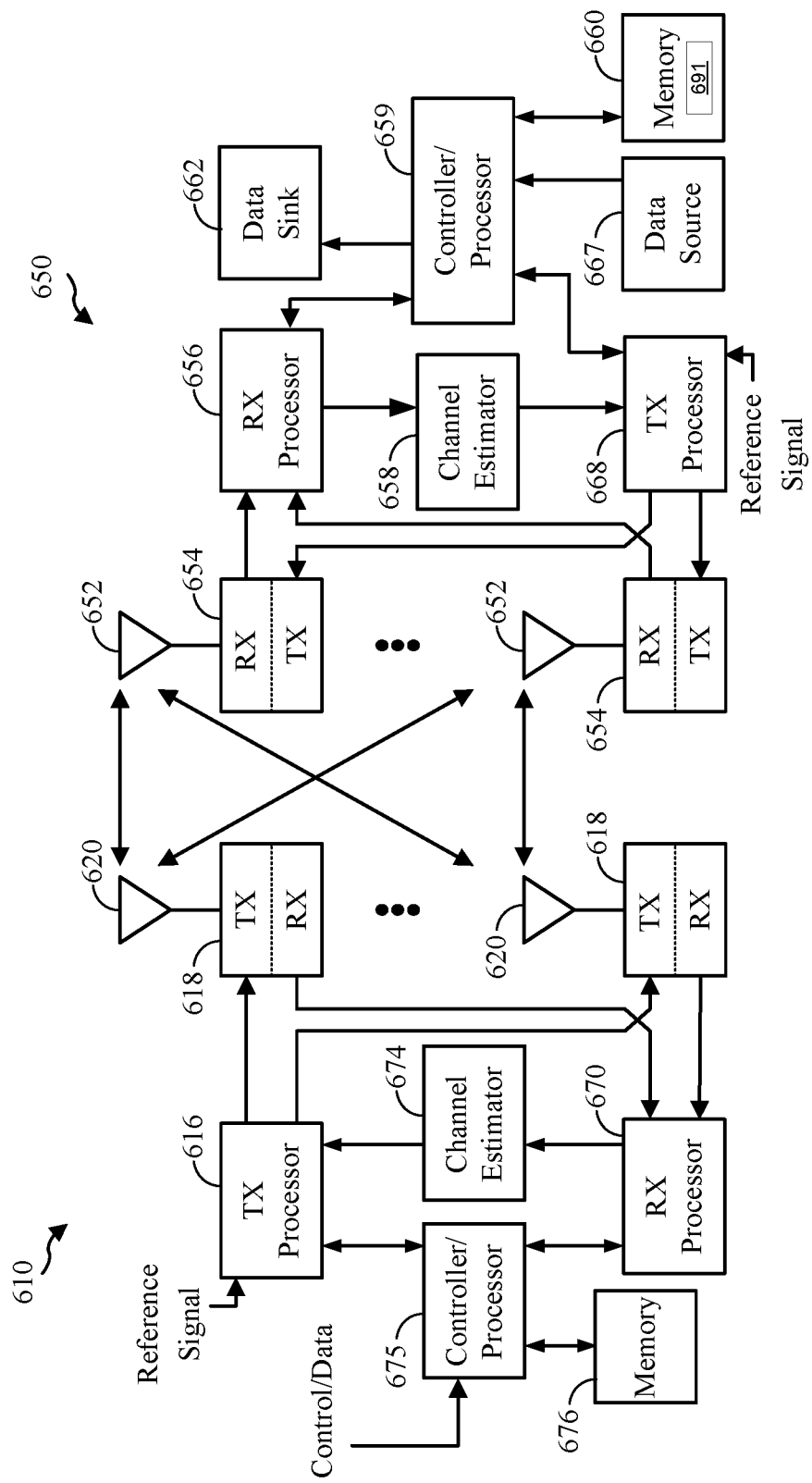
FIG. 6 is a block diagram conceptually illustrating an example of a base station in communication with a user equipment (UE) in a telecommunications system.

FIG. 6 is a block diagram of a base station (e.g., eNodeB or node B) 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 720 via a separate transmitter (TX) 618. Each transmitter (TX) 618 modulates an RF carrier with a respective spatial stream for transmission.

At the UE 650, each receiver (RX) 654 receives a signal through its respective antenna 652. Each receiver (RX) 654 recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 are provided to different antenna 652 via separate transmitters (TX) 654. Each transmitter (TX) 654 modulates an RF carrier with a respective spatial stream for transmission.

The uplink transmission is processed at the base station 610 in a manner similar to that described in connection with the receiver function at the UE 650. Each receiver (RX) 618 receives a signal through its respective antenna 620. Each receiver (RX) 618 recovers information modulated onto an RF carrier and provides the information to a RX processor 670. The RX processor 670 may implement the L1 layer.

The controller/processor 675 implements the L2 layer. The controller/processor 675 and 659 can be associated with memories 676 and 660, respectively that store program codes and data. For example, the controller/processors 675 and 659 may provide various functions including timing, peripheral interfaces, voltage regulation, power management, and other control functions. The memories 676 and 660 may be referred to as a computer-readable media. For example, the memory 660 of the UE 650 may store a wireless communication module 691 which, when executed by the controller/processor 659, configures the UE 650 to expedite cell reselection according to aspects of the present disclosure.

In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
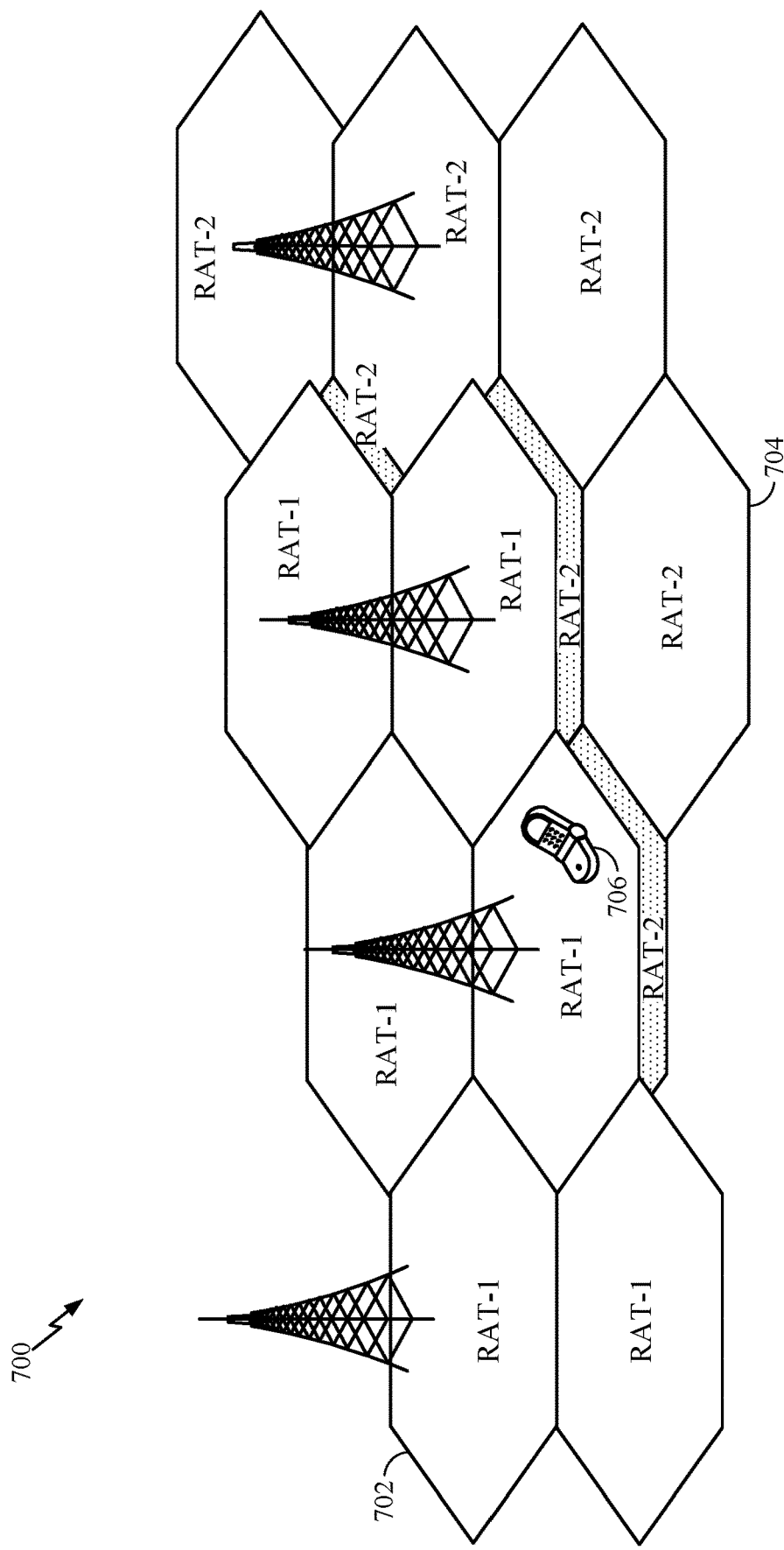
FIG. 7 is a diagram illustrating network coverage areas according to aspects of the present disclosure.

Some networks may be deployed with multiple radio access technologies. FIG. 7 illustrates a network utilizing multiple types of radio access technologies (RATs), such as but not limited to GSM (second generation (2G)), TD-SCDMA (third generation (3G)), LTE (fourth generation (4G)) and fifth generation (5G). Multiple RATs may be deployed in a network to increase capacity. Typically, 2G and 3G are configured with lower priority than 4G. Additionally, multiple frequencies within LTE (4G) may have equal or different priority configurations. Reselection rules are dependent upon defined RAT priorities. Different RATs are not configured with equal priority.

In one example, the geographical area 700 includes RAT-1 cells 702 and RAT-2 cells 704. In one example, the RAT-1 cells are 2G or 3G cells and the RAT-2 cells are LTE cells. However, those skilled in the art will appreciate that other types of radio access technologies may be utilized within the cells. A user equipment (UE) 706 may move from one cell, such as a RAT-1 cell 702, to another cell, such as a RAT-2 cell 704. The movement of the UE 706 may specify a handover or a cell reselection.

The handover or cell reselection may be performed when the UE moves from a coverage area of a first RAT to the coverage area of a second RAT, or vice versa. A handover or cell reselection may also be performed when there is a coverage hole or lack of coverage in one network, when there is traffic balancing between a first RAT and the second RAT networks or can be based on a type of communication desired by the UE. As part of that handover or cell reselection process, while in a connected mode or discontinuous reception mode (DRX) with a first system or RAT (e.g., TD-SCDMA) a UE may be specified to perform activities with one or more neighbor cells. For example, the UE may perform measurement of a neighboring cell of the first, a second and/or third RAT (such as GSM cell, LTE or TD-SCDMA). The discontinuous reception mode may include idle mode, cell paging channel (CELL_PCH) mode, forward access channel (FACH) and universal terrestrial radio access network (UTRAN) registration area paging channel (URA_PCH) mode.

The UE may tune away from the first RAT to perform the activities at the second (and/or third) RAT. The activities performed when tuning away may include selecting and monitoring an indicated paging indicator channel (PICH) and paging channel (PCH), monitoring for paging information of the second (or third) RAT, monitoring and collecting system information of the second (or third) RAT (e.g., frequency of the second (or third) RAT), performing measurements (e.g., inter radio access technology measurements) for cell(s) of the first RAT and neighbor cells of the second (or third) RAT, executing cell reselection evaluation processes, and/or performing cell reselection to reselect to a neighbor cell of the second (or third) RAT when cell reselection trigger conditions are met.

In some networks, when the UE is camped on or connected to a serving cell of a first RAT, the UE may be informed of multiple neighbor cells. The neighbor cells may be of a same RAT and may have different frequencies or be of different RATs with same and/or different frequencies. For example, the UE may receive or be informed of LTE neighbor frequencies/cells with or without cell identifiers while camped on a TD-SCDMA cell. The neighbor cell information may be broadcast from a network (e.g., TD-SCDMA network). In some instances, only frequencies of a particular RAT (e.g., LTE) are broadcasted to the UE.

In accordance with the reselection procedure, the UE performs inter radio access technology (IRAT) measurement on neighbor cells (e.g., LTE neighbor cells/frequencies). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

During the IRAT measurement, if the cell reselection trigger conditions are continuously met upon the expiration of a reselection timer (e.g., Treselection), the serving RAT informs the target RAT to initiate cell reselection to a detected cell of the target RAT during the IRAT measurement. The reselection timer governs when a UE may reselect to a new cell. The UE may not be permitted to reselect to a desired target RAT until expiration of the reselection timer. Thus, the UE reselects to the target cell if the cell reselection trigger conditions are continuously met upon expiration of the reselection timer. For example, a TD-SCDMA module of the UE informs an LTE module of the UE to start cell reselection to the target LTE cell/frequency detected during the IRAT measurement. The LTE module of the UE then starts acquisition on the LTE frequency of the detected target LTE cell. The LTE module then attempts to camp on the target LTE cell after collection of broadcasted system information blocks (SIB s).

As noted, after the UE determines that trigger conditions are satisfied for a cell reselection, the UE waits until an expiration of a reselection for the UE to reselect to the new cell. In some instances, however, waiting for the expiration of the reselection of the reselection timer results in a RAT failure event. For example, the RAT failure event may include call setup failure or a dropped call when the UE attempts to perform call setup on a deteriorated serving cell.

Fast Cell Reselection

Aspects of the present disclosure are directed to expediting cell reselection from a first radio access technology (RAT) to a second RAT based on a difference between a signal quality of a cell/frequency of the serving RAT and a signal quality of a neighbor RAT when the signal quality of the serving cell falls below a threshold. When a user equipment (UE) is camped on the first RAT and the UE is in the coverage area of the second RAT, the UE searches for one or more frequencies (corresponding to one or more cells) and measures signal quality of the one or more detected cells. When the results of the measurement indicate that cell reselection trigger conditions are met, the UE starts a cell reselection timer or time to trigger. For example, the UE starts the reselection timer for reselecting to a neighbor cell when a signal quality of the neighbor cell of the second RAT is determined to exceed a neighbor cell threshold, when the signal quality of the serving cell is below a first threshold.

In one aspect of the disclosure, the UE speeds up reselecting to the neighbor cell based on a difference between the signal quality of the serving cell and the signal quality of the neighbor cell when the signal quality of the serving cell falls below a second threshold. For example, the UE speeds up the cell reselection when the difference between the signal quality of the serving cell and the signal quality of the neighbor cell is above a third threshold. The cell reselection is expedited by reselecting to the neighbor cell prior to a scheduled expiration of the reselection timer. The reselection may occur prior to a call setup on the UE. The UE avoids dropped calls or call failure by expediting the reselection to the neighbor cell. In one aspect of the disclosure the each of the thresholds is independently defined by the UE and/or the network.

Cell reselection is a procedure triggered by user equipments (UEs) in idle mode to determine which cell to camp on. Cell reselection may rely on measured radio frequency (RF) quality and system parameters broadcasted from networks. For example, a mobile UE observes (e.g., searches and/or measures) signal quality of the serving and neighbor cells.

In idle mode (as well as in (e.g., forward access channel (FACH)/cell paging channel (CELL_PCH)/universal terrestrial radio access network (UTRAN) registration area paging channel (URA_PCH) states in connected mode), the UE performs various activities like serving cell measurements, neighbor cell measurements and cell reselection.

Upon receiving a measurement request according to a radio resource control (RRC) protocol with configuration originated from a system information block (SIB), a protocol layer (Layer 1) of the UE configures the UE for measurement and starts measuring the serving cell and other cells (intra/inter-frequency/inter-radio access technology (RAT)) as configured by a radio resource control (RRC).

The UE evaluates a signal quality of the serving cell to determine whether the signal quality of the serving cell satisfies a criteria (e.g., signal strength threshold) to serve the UE. The UE also evaluates the signal quality of the neighbor cells to determine whether the signal quality of the neighbor cells satisfy a criteria, and ranks the neighbor cells based on their measured signal quality.

If cell reselection criteria for a neighbor cell is satisfied, then the UE initiates reselection to the neighbor cell (e.g., the highest ranked neighbor cell).

Aspects of the present disclosure are directed to a fast cell reselection scheme that may be applied to networks, such as, but not limited to, the universal mobile telecommunications system (UMTS), the time division-code division multiple access (TD-CDMA), and long term evolution (LTE).

Figure 8:
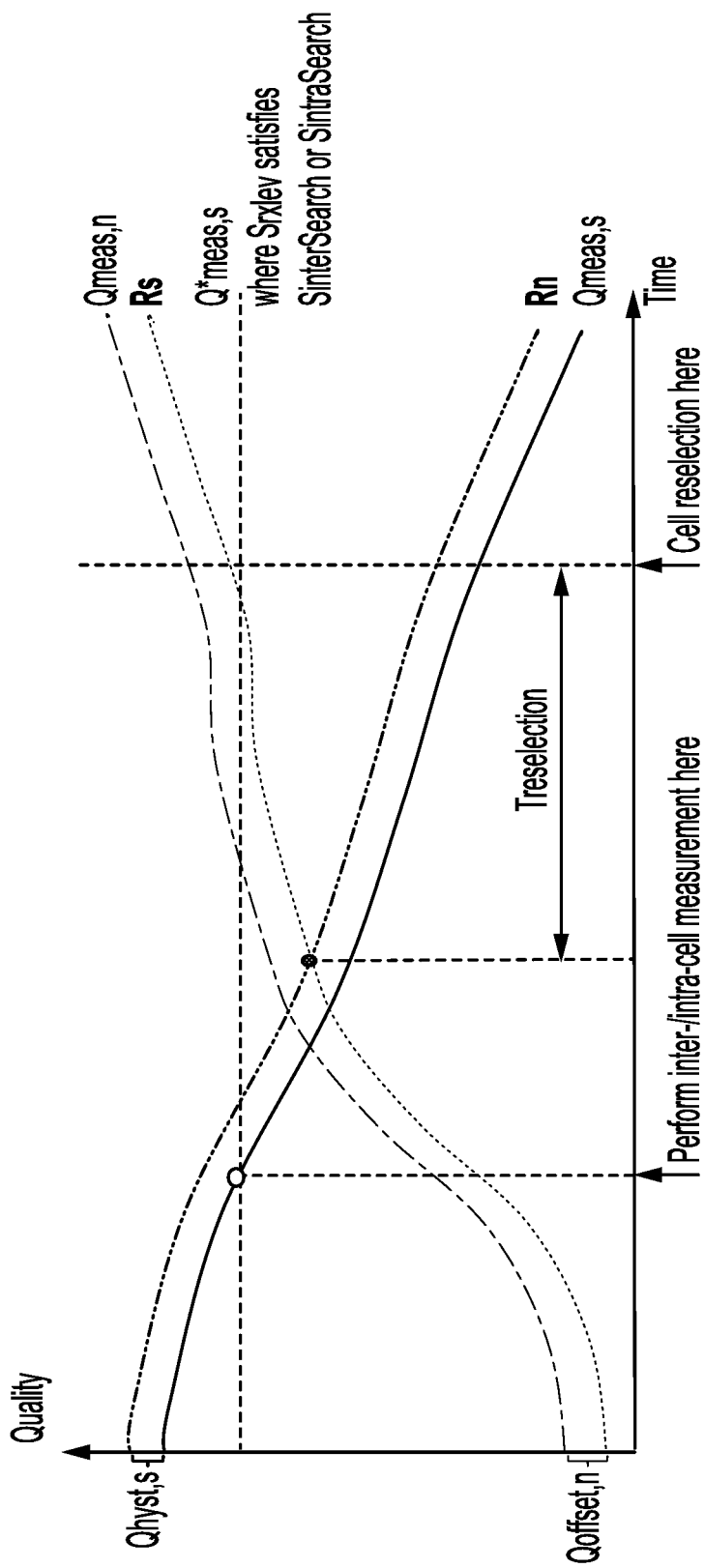
FIG. 8 is a block diagram illustrating the measurement and evaluation of the serving cell and intra/inter-frequency cells according to one aspect of the present disclosure.

FIG. 8 is a diagram illustrating the measurement and evaluation of the serving cell and intra/inter-frequency cells. The measurement of the serving cell may include: measuring and evaluating serving cell S criteria (e.g., signal quality criteria) once every discontinuous reception (DRX) cycle. If the S criteria failed for defined number (Nserv) of consecutive DRX cycles, UE initiates neighbor cell measurements.

For the measurement of intra/inter-frequency cells, the UE performs intra-frequency measurement if Sserv (e.g., signal quality of serving cell)<=SintraSearch (e.g., intra-frequency threshold). The UE performs inter-frequency measurements if Sserv<=SinterSearch (e.g., inter-frequency threshold), and:

$$S\_rxlev = Q\_rxlevmeas - (Q\_rxlevmin + Q\_rxlevminOffset) - P\_comp$$

The cell reselection is triggered when Treselection is expired.

Figure 9:
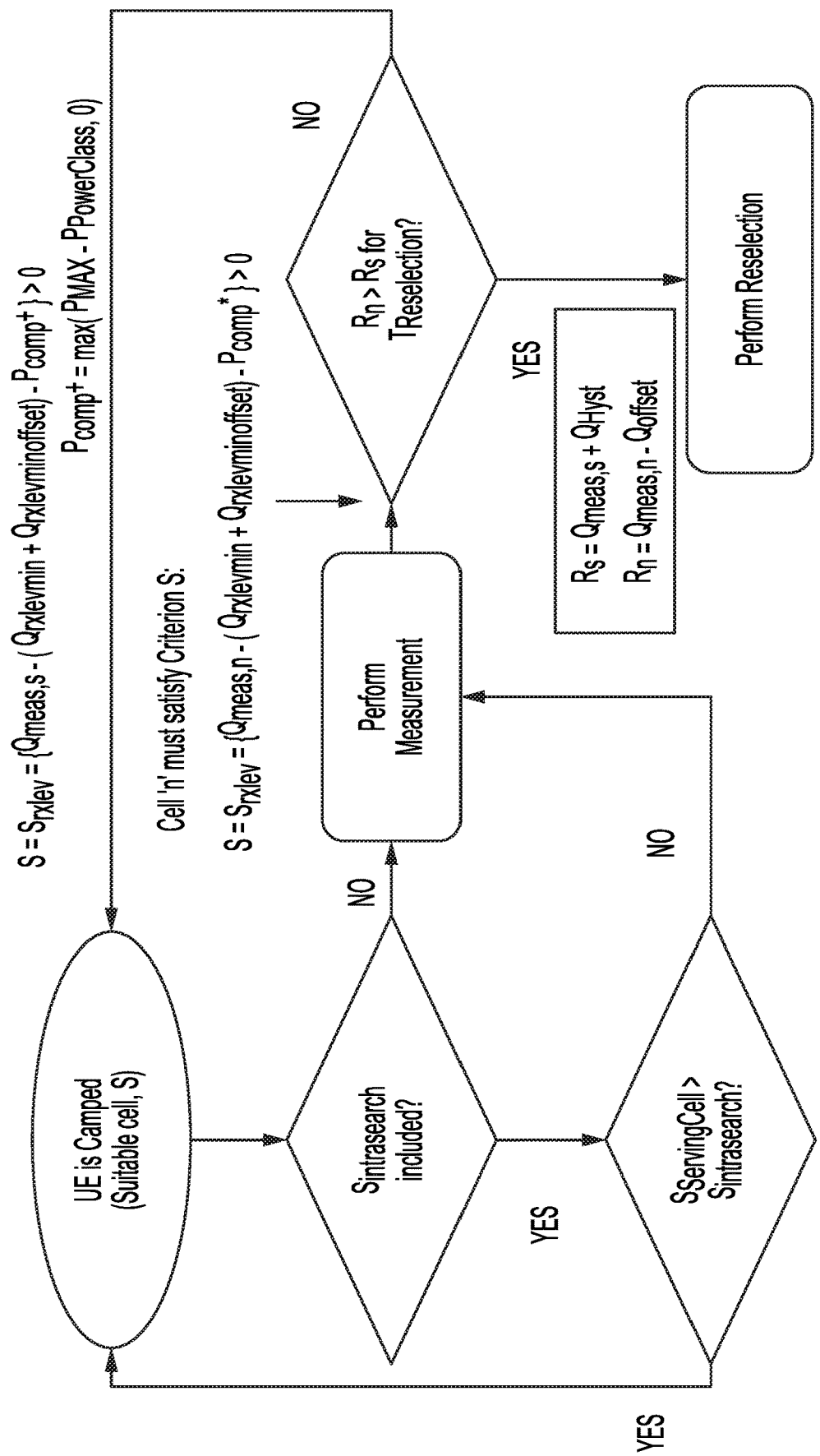
FIG. 9 is flow diagram illustrating an example process according to aspects of the present disclosure.

FIG. 9 illustrates an example flow diagram according to an aspect of the present disclosure and includes the following variables:

where $Q_{meas,s}$ is the signal quality/strength measurement (e.g., reference signal received quality) of the serving cell;

$Q_{hyst,s}$ is an hysteresis value of the serving cell;

$Q_{meas,n}$ is the signal quality/strength measurement of the neighbor cell;

$Q_{offset,n}$ is an offset between the serving cell and the neighbor cell;

Srxlev (e.g., S or Sservingcell) is a cell reselection received level or value such as signal quality of the serving cell;

Qrxlevmin is a minimum specified or required receive level in a cell;

Qrxlevminoffset is an offset from the minimum specified or required receive level in the cell;

Ppowerclass is a transmit power of the UE;

Pmax is a maximum transmit power;

Rs is a serving cell rank; and

Rn is a neighbor cell (non-serving cell) rank.

The variable S intrasearch (e.g., intra-frequency threshold) controls whether the UE must make measurements of intra-frequency cells while camped on a current cell. Further, S intersearch (e.g., inter-frequency threshold) controls whether the UE must make measurements of inter-frequency cells while camped on a current cell. The Treselection (reselection timer) governs when the UE may reselect to a new cell. Qrxlevmeas is the current cell's reference signal received power (RSRP). Pcomp is a cower compensation value for uplink and/or downlink communication.

Problems with the current approach may include call setup failure due to slow reselection. For example, call setup failure due to radio link failure (RLF) caused by a bad serving cell of a network (e.g., TD-SCDMA, WCDMA or LTE).

Slow reselection may cause a call drop during call setup for connected mode. When a UE is in connected mode and wants to switch to a better cell, handover message is easily delayed by measurement control messages and radio bearer (RB) messages (e.g., RB3) messages, e.g., for call setup after RRC connection setup. Downlink (DL) conditions may deteriorate quickly resulting in call drop before the UE receives the complete handover message, especially for the bandwidth limited cases.

This kind of call setup failure might be avoided if the UE has a chance to camp on a better cell before call setup, viz. to trigger a cell reselection procedure before a time to trigger (TTT) or reselection timer expires if the serving cell is not good enough (e.g. received signal code power (RSCP) or signal quality of the serving cell is lower than a threshold) and there is a much better neighbor cell.

Aspects of the disclosure are applicable to WCDMA, TD-SCDMA, LTE or other radio access technologies (RATs).

Figure 10:
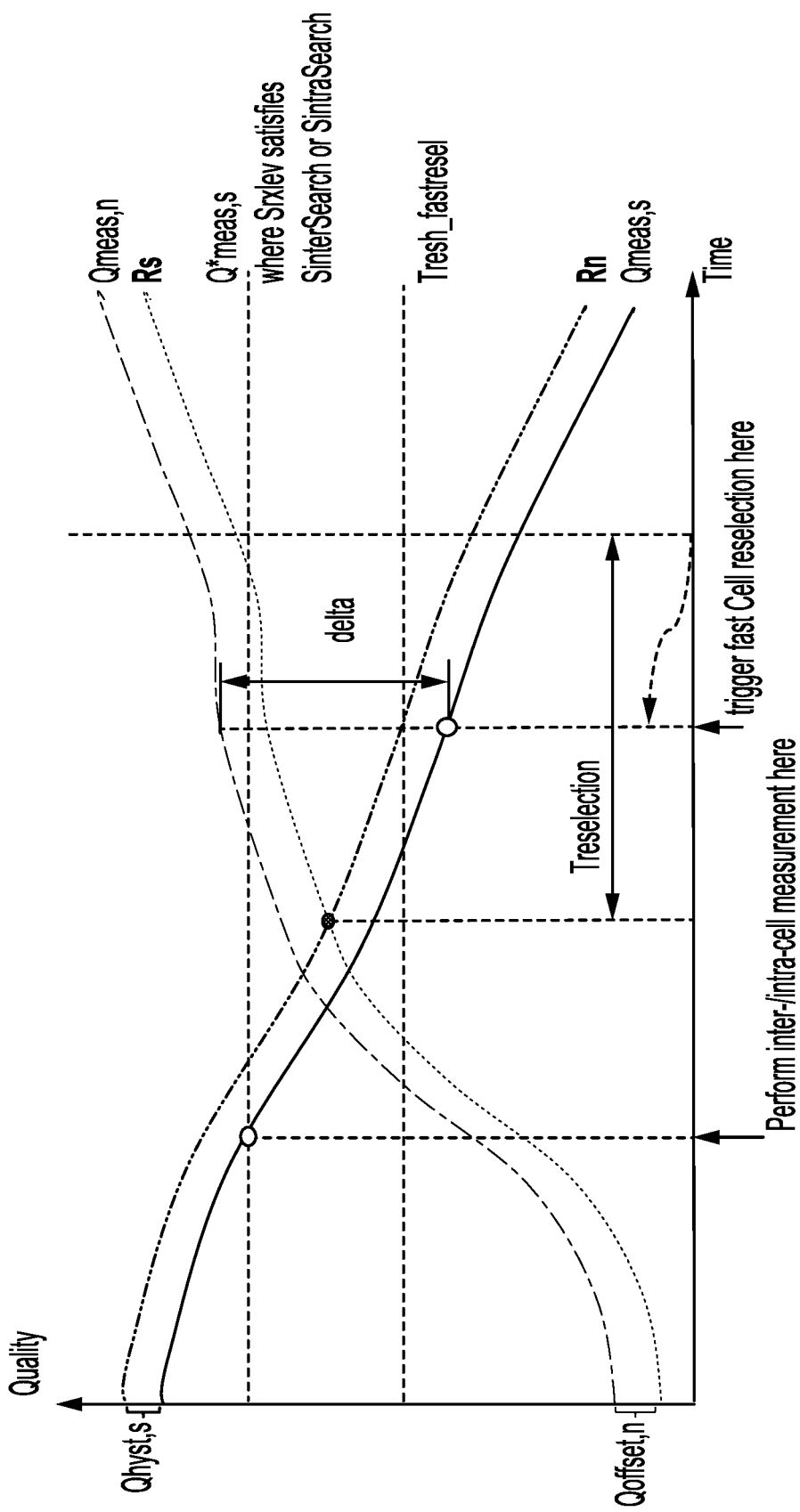
FIG. 10 is a block diagram illustrating the measurement and evaluation of the serving cell and intra/inter-frequency cells according to one aspect of the present disclosure.

FIG. 10 is a block diagram illustrating the measurement and evaluation of the serving cell and intra/inter-frequency cells. The cell reselection is triggered earlier before an expiration of a reselection timer, e.g., T reselection, when the following condition is satisfied:

```
If (TTT is started and t<T_reselection) {
    if Q_(meas,s)≤[(Tresh)]_fastresel and Q_(meas,n)-Q_(meas,s)≥delta (dB)
        trigger cell reselection immediately;
}
```

The $Tresh_{fastresel}$ and delta may be configured differently for different systems, where the $Tresh_{fastresel}$ is a signal quality/strength threshold for fast reselection.

Figure 11:
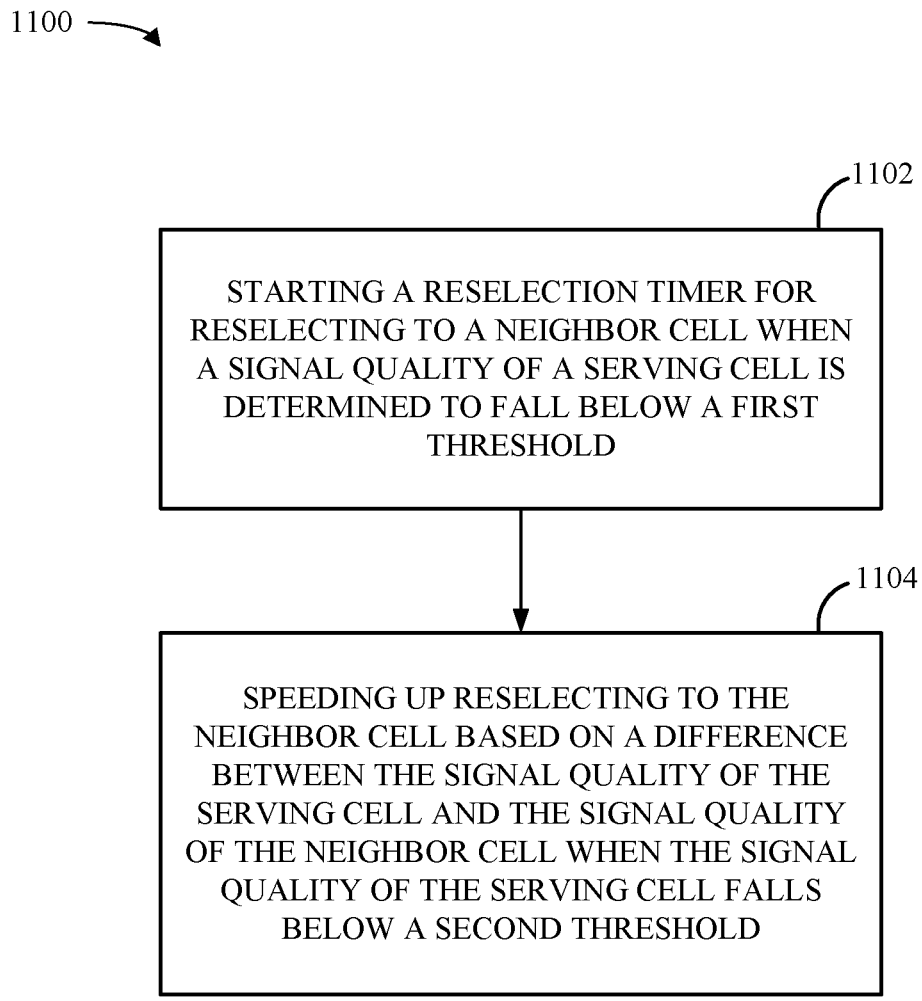
FIG. 11 is a block diagram illustrating a method for expediting cell reselection according to one aspect of the present disclosure.

FIG. 11 shows a wireless communication method 1100 for expediting reselection according to one aspect of the disclosure. At block 1102, a user equipment (UE) starts a reselection timer for reselecting to a neighbor cell when a signal quality of a serving cell is determined to fall below a first threshold. At block 1104, the UE speeds up reselecting to the neighbor cell based on a difference between the signal quality of the serving cell and the signal quality of the neighbor cell when the signal quality of the serving cell falls below a second threshold.

Figure 12:
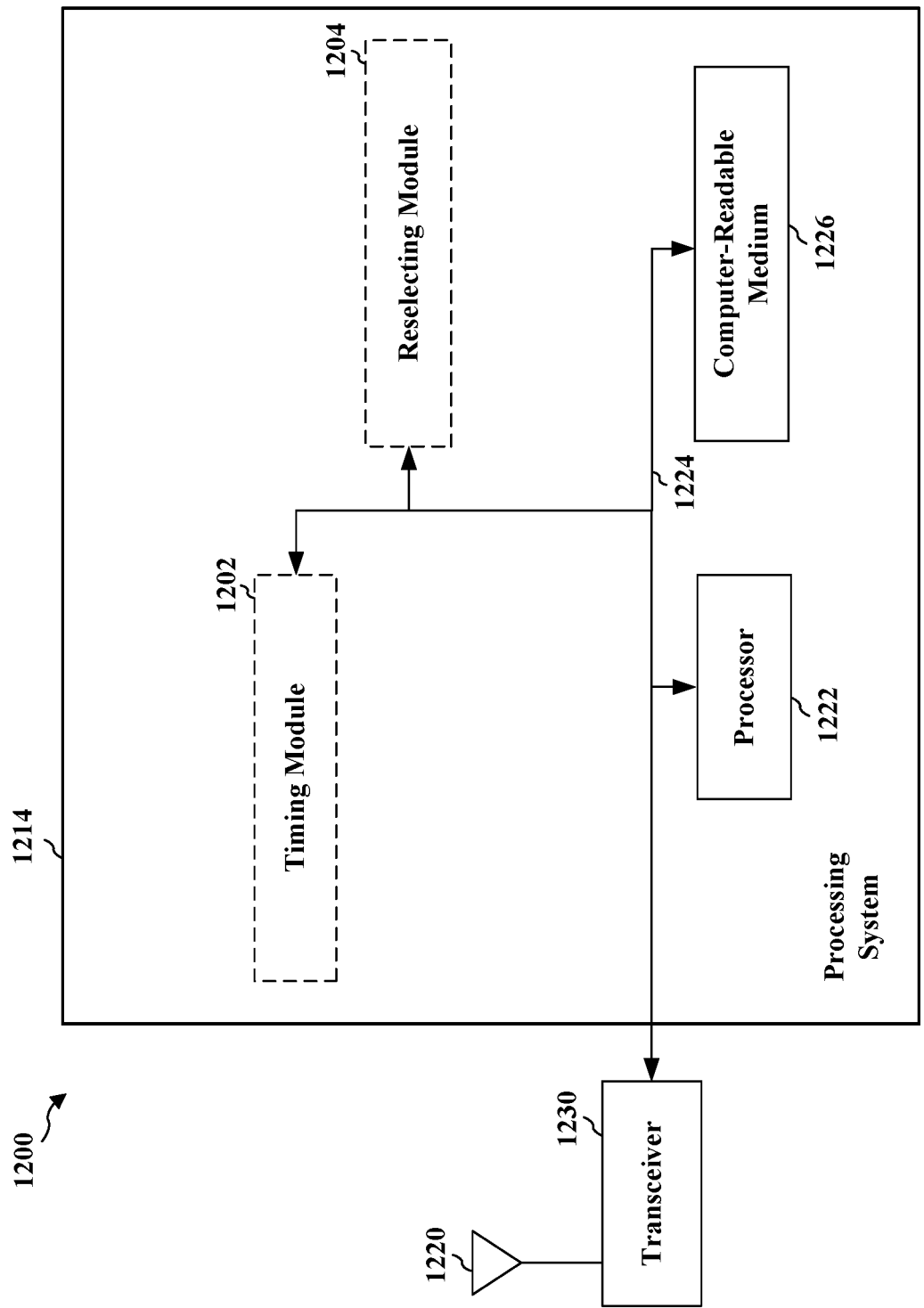
FIG. 12 is a diagram illustrating an example of a hardware implementation for an apparatus employing a processing system according to one aspect of the present disclosure.

FIG. 12 is a diagram illustrating an example of a hardware implementation for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1222 the modules 1202, 1204 and the non-transitory computer-readable medium 1226. The bus 1224 may also link various other circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a non-transitory computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system 1214 includes a timing module 1202 for starting a reselection timer for reselecting to a neighbor cell when a signal quality of a serving cell is determined to fall below a first threshold. The processing system 1214 also includes a reselecting module 1204 for speeding up reselecting to the neighbor cell based on a difference between the signal quality of the serving cell and the signal quality of the neighbor cell when the signal quality of the serving cell falls below a second threshold. The modules 1202 and 1204 may be software modules running in the processor 1222, resident/stored in the computer-readable medium 1226, one or more hardware modules coupled to the processor 1222, or some combination thereof. The processing system 1214 may be a component of the UE 650 of FIG. 6 and may include the memory 660, and/or the controller/processor 659.

In one configuration, an apparatus such as a UE 650 is configured for wireless communication including means for starting a reselection timer. In one aspect, the reselection timer starting means may be the receive processor 656, the controller/processor 659, the memory 660, the wireless communication module 691, the timing module 1202, and/or the processing system 1214 configured to perform the aforementioned means. In one configuration, the means functions correspond to the aforementioned structures. In another aspect, the aforementioned means may be a module or any apparatus configured to perform the functions recited by the reselection timer starting means.

The UE 650 is also configured to include means for speeding up reselecting to the neighbor cell. In one aspect, the speeding up means may include the antennas 652/920, the receiver 654, the transceiver 1230, the receive processor 656, the controller/processor 659, the memory 660, the reselecting module 1204, and/or the processing system 1214 configured to perform the functions recited by the identifying means. In one configuration, the means and functions correspond to the aforementioned structures. In another aspect, the aforementioned means may be a module or any apparatus configured to perform the functions recited by the speeding up means.

Several aspects of a telecommunications system has been presented with reference to LTE, TD-SCDMA and GSM systems. As those skilled in the art will readily appreciate, various aspects described throughout this disclosure may be extended to other telecommunication systems, network architectures and communication standards, including those with high throughput and low latency such as 4G systems, 5G systems and beyond. By way of example, various aspects may be extended to other UMTS systems such as W-CDMA, high speed downlink packet access (HSDPA), high speed uplink packet access (HSDPA), high speed packet access plus (HSPA+) and TD-CDMA. Various aspects may also be extended to systems employing long term evolution (LTE) (in FDD, TDD, or both modes), LTE-Advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of wireless communication, comprising:
   measuring a signal quality of a serving cell and a signal quality of a neighbor cell;
   starting a reselection timer for reselecting the neighbor cell based on the measured signal quality of the serving cell and the measured signal quality of the neighbor cell; and
   reselecting the neighbor cell prior to a scheduled expiration of the reselection timer based on a pending call setup, wherein the neighbor cell is reselected prior to the call setup.

2. The method of claim 1, wherein the reselection timer is started when the measured signal quality of the serving cell falls below a first threshold and when the measured signal quality of the neighbor cell exceeds a neighbor cell threshold.

3. The method of claim 1, wherein the neighbor cell is reselected based on a difference between the measured signal quality of the serving cell and the measured signal quality of the neighbor cell.

4. The method of claim 1, further comprising performing the call setup with the neighbor cell.

5. A user equipment (UE), comprising:
   a memory; and
   one or more processors coupled to the memory, the one or more processors configured to:
      measure a signal quality of a serving cell and a signal quality of a neighbor cell;
      start a reselection timer for reselecting the neighbor cell based on the measured signal quality of the serving cell and the measured signal quality of the neighbor cell; and
      reselect the neighbor cell prior to a scheduled expiration of the reselection timer based on a pending call setup, wherein the neighbor cell is reselected prior to the call setup.

6. The UE of claim 5, wherein the reselection timer is started when the measured signal quality of the serving cell falls below a first threshold and when the measured signal quality of the neighbor cell exceeds a neighbor cell threshold.

7. The UE of claim 5, wherein the neighbor cell is reselected based on a difference between the measured signal quality of the serving cell and the measured signal quality of the neighbor cell.

8. The UE of claim 5, wherein the one or more processors are further configured to perform the call setup with the neighbor cell.

9. An apparatus of wireless communication, comprising:
   means for measuring a signal quality of a serving cell and a signal quality of a neighbor cell;
   means for starting a reselection timer for reselecting the neighbor cell based on the measured signal quality of the serving cell and the measured signal quality of the neighbor cell; and
   means for reselecting the neighbor cell prior to a scheduled expiration of the reselection timer based on a pending call setup, wherein the neighbor cell is reselected prior to the call setup.

10. The apparatus of claim 9, wherein the reselection timer is started when the measured signal quality of the serving cell falls below a first threshold and when the measured signal quality of the neighbor cell exceeds a neighbor cell threshold.

11. The apparatus of claim 9, wherein the neighbor cell is reselected based on a difference between the measured signal quality of the serving cell and the measured signal quality of the neighbor cell.

12. The apparatus of claim 9, further comprising means for performing the call setup with the neighbor cell.

13. A non-transitory computer-readable medium having instructions stored thereon, the instructions comprising codes executable for a processor to perform:
- measuring a signal quality of a serving cell and a signal quality of a neighbor cell;
- starting a reselection timer for reselecting the neighbor cell based on the measured signal quality of the serving cell and the measured signal quality of the neighbor cell; and
- reselecting the neighbor cell prior to a scheduled expiration of the reselection timer based on a pending call setup, wherein the neighbor cell is reselected prior to the call setup.

14. The non-transitory computer-readable medium of claim 13, wherein the reselection timer is started when the measured signal quality of the serving cell falls below a first threshold and when the measured signal quality of the neighbor cell exceeds a neighbor cell threshold.

15. The non-transitory computer-readable medium of claim 13, wherein the neighbor cell is reselected based on a difference between the measured signal quality of the serving cell and the measured signal quality of the neighbor cell.

16. The non-transitory computer-readable medium of claim 13, wherein the instructions further comprise codes to perform the call setup with the neighbor cell.

* * * * *